(12) United States Patent
Sakai et al.

(10) Patent No.: US 7,675,896 B2
(45) Date of Patent: Mar. 9, 2010

(54) COMMUNICATION APPARATUS AND CONTROL METHOD THEREOF

(75) Inventors: Tatsuhiko Sakai, Nakano-ku (JP); Akira Matsui, Ohta-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 1048 days.

(21) Appl. No.: 11/300,834

(22) Filed: Dec. 14, 2005

(65) Prior Publication Data

US 2006/0133295 A1 Jun. 22, 2006

(30) Foreign Application Priority Data

Dec. 16, 2004 (JP) .............................. 2004-364787
Dec. 16, 2004 (JP) .............................. 2004-364788

(51) Int. Cl.
*H04J 3/16* (2006.01)
(52) U.S. Cl. .................... 370/346; 370/252; 370/395.2
(58) Field of Classification Search ................. 370/346, 370/252, 395.2
See application file for complete search history.

(56) References Cited

U.S. PATENT DOCUMENTS

| 6,026,297 | A  | * | 2/2000  | Haartsen ................... 455/426.1 |
| 7,024,482 | B2 |   | 4/2006  | Hlasny |
| 7,450,577 | B2 | * | 11/2008 | Johansson et al. ........... 370/386 |
| 2004/0259542 | A1 |   | 12/2004 | Viltamaki et al. |
| 2006/0050670 | A1 | * | 3/2006  | Hillyard et al. ............. 370/338 |

FOREIGN PATENT DOCUMENTS

| EP | 1 331 763       | 7/2003  |
| EP | 1 473 951 A2    | 11/2004 |
| FI | 20030660        | 5/2003  |
| JP | 2001-218255 A   | 8/2001  |
| JP | 2003-218881 A   | 7/2003  |
| JP | 2004-511140 A   | 4/2004  |
| WO | 99/14898        | 3/1999  |

(Continued)

OTHER PUBLICATIONS

Miyazu, Kazuhiro "Technology KAITAISHINSHO Bluetooth™ Technical Interpretation Guide", edited by Japan Ericsson, RIC Telecom, pp. 21, 22, 39-41, 45-47, and 181-186, Jun. 2001.

(Continued)

*Primary Examiner*—Barry W Taylor
(74) *Attorney, Agent, or Firm*—Cowan, Liebowitz & Latman, P.C.

(57) ABSTRACT

The claimed invention is directed to a communication apparatus connectable to a plurality of networks, which comprises a setting unit that adjusts and setting, in accordance with a communication condition of each of the plurality of networks, a communication hold period in which the communication apparatus does not communicate with any one of the plurality of networks; a notification unit that notifies each of the plurality of networks of the communication hold period set by said setting unit; and a stop unit that stops communication with the plurality of networks on the basis of the setting of the communication hold period, wherein said setting unit sets the communication hold period of each network so as to overlap portions of the communication hold periods of the plurality of networks without any overlap of communication participation times of the plurality of networks.

9 Claims, 15 Drawing Sheets

FOREIGN PATENT DOCUMENTS

| WO | 01/41348 | 6/2001 |
| WO | 02/28118 A | 4/2002 |
| WO | 2004/102893 A | 11/2004 |

OTHER PUBLICATIONS

INPADOC abstract Indicating patent family members, Sep. 2007.

Official Communication from EPO dated Jul. 3, 2007.

Baatz et al, "Bluetooth Scatternets: An Enhanced Adaptive Scheduling Scheme", Proceedings IEEE INFOCOM 2002, the conference on Computer Communications 21st, annual Joint Conference of the IEEE Computer and Communications Societies, New York, NY Jun. 23-27, 2002, vol. 1 of 3, pp. 782-790.

Har-Shai L. et al, "Load-Adaptive Inter-Piconet Scheduling in Small-Scale Bluetooth Scatternets", IEEE Communications Magazine, IEEE Service Center, New York, NY, vol. 42, No. 7, Jul. 2004, pp. 136-142.

Kapoor R. et al, "A Fair and Traffic Copendent Scheduling Algorithm for Bluetooth Scatternets", Mobile Networks Appl; Mobile Networks and Applications, Feb. 2004, vol. 9, Nr. 1, pp. 9-20.

Extended European Search Report and Communication dated Jun. 6, 2006.

The above foreign document references 1-4 were cited in a Jun. 5, 2009 Japanese Office Action that issued in Japanese Patent Application No. 2004-364787, which is enclosed without English Translation.

* cited by examiner

FIG. 6A

| CONDITION | COMMUNICATION HOLD PERIOD LENGTH L | TRANSFER PRIORITY |
|---|---|---|
| Print_Printing | 0.01 | LOW |
| Print_Idle | 0.95 | HIGH |
| Print_Buffer_full | 0.95 | HIGH |
| Print_Error | 0.95 | HIGH |
| FTP_Transfer | 0.01 | LOW |
| FTP_Idle | 0.95 | HIGH |
| FTP_Error | 0.95 | HIGH |
| Power_Save | 0.20 (MINIMUM NONPARTICIPATION PERIOD) | |

F I G. 6B

| PROCESS ID | OPERATION STATE | COMMUNICATION HOLD PERIOD LENGTH L | COMMUNICATION HOLD PERIOD CYCLE | COMMUNI-CATION HOLD PERIOD START TIME | TRANSFER PRIORITY |
|---|---|---|---|---|---|
|  |  |  | T |  |  |

204b

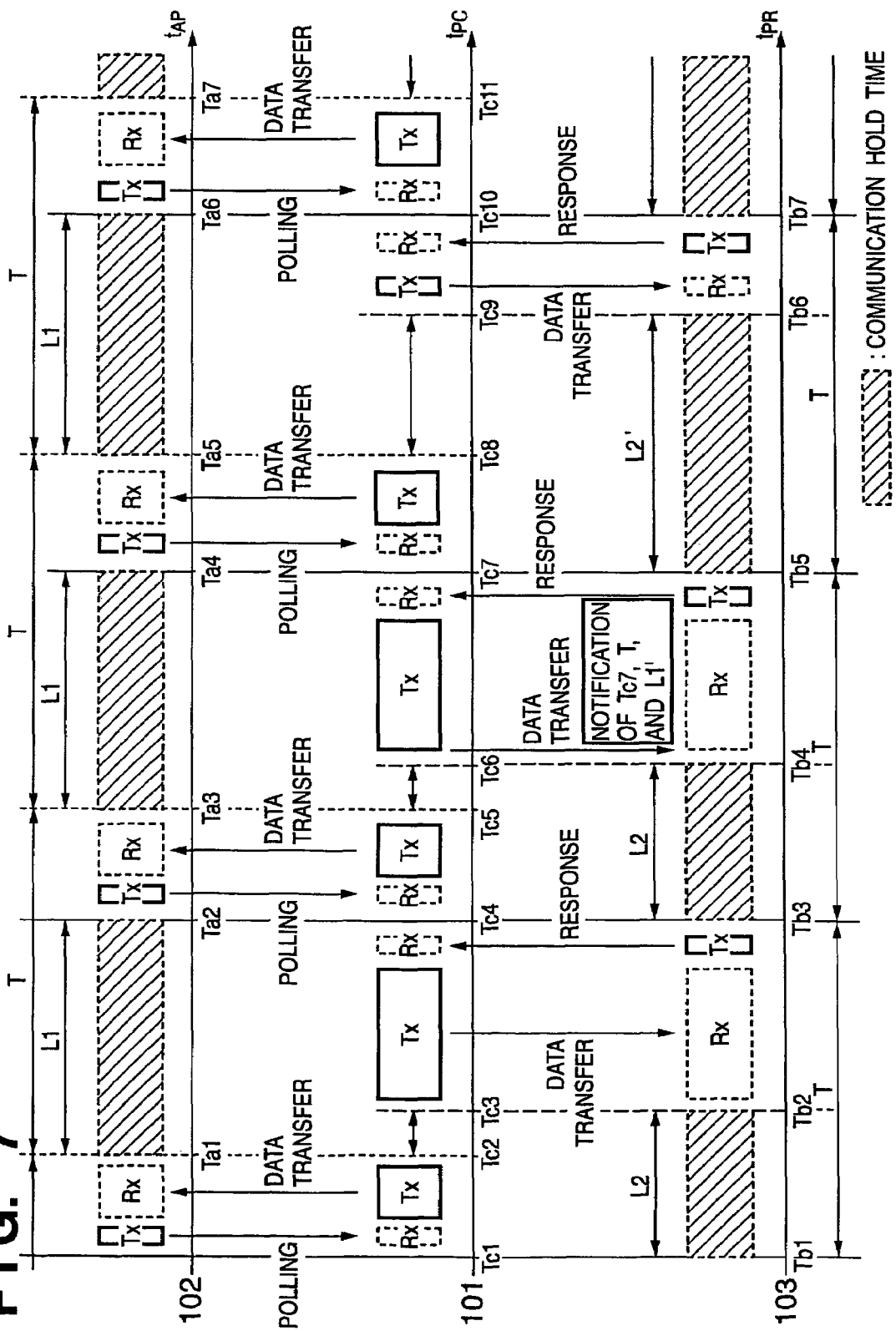

COMMUNICATION APPARATUS AND CONTROL METHOD THEREOF

FIELD OF THE INVENTION

The present invention relates to a communication apparatus and control method thereof and, more particularly, to a scheme of causing a communication device to adjust the participation period in each network in accordance with the communication environment or communication condition of each network in, e.g., a system in which one communication device is connected to a plurality of networks.

BACKGROUND OF THE INVENTION

In Bluetooth®, a network includes a master which performs polling control for communication timing control and access control of a communication device, and a slave which performs communication in accordance with a signal from the master. One master and at most seven slaves can construct a piconet. In order to connect the communication device belonging to the Bluetooth® network to a LAN, an access point serves as the master, and the communication device connected to the network serves as the slave. In Bluetooth®, a frequency hopping spread spectrum scheme is used. In the piconet, communication time division multiplex (time division slot multiplex) is performed for each slot, and a plurality of terminals in the piconet can communicate with each other. Since a slot synchronous state must be maintained, all the terminals in the piconet have counters called Bluetooth clocks. In one piconet, in order to match the Bluetooth clock value of the slave with that of the master, a clock offset which is a shift between the Bluetooth clock values of the slave and master is calculated. Accordingly, the clock synchronous state can be maintained by adding (subtracting) the offset value to (from) the Bluetooth clock value of the slave. The terminals in a single piconet have the same frequency hopping pattern. Hence, the terminals can communicate with each other.

Bluetooth® defines the following arrangement (to be referred to as a scatternet hereinafter). When the communication device currently connected to the access point (a piconet) is to participate in another piconet (e.g., a new piconet including a communication device such as a PC), the communication device shifts to a power saving mode in which intermittent reception is temporarily performed in communication with the master (in this case, the access point) which controls the current piconet. Then, the connection with the access point is released, and communication is performed after switching to the communication timing of the new piconet (e.g., see non-patent reference 1).

[Non-Patent Reference 1]

"Technology KAITAISINSHO Bluetooth™ Technical Interpretation Guide" edited by Japan Ericsson, written by Kazuhiro Miyazu, Ric Telecom, pp. 39-41, pp. 181-185).

In a Bluetooth® piconet operation, the communication devices (slaves) communicate with each other via the master which controls an access timing. Accordingly, a traffic increases in a radio section, and data cannot be efficiently transferred. In the scatternet operation described as a means for avoiding this problem in the prior art, access timing control for a specific slave device (to be referred to as a slave 1 hereinafter) is performed by determining the access timing in accordance with the power-saving mode timing set between the slave 1 and master which operate asynchronously. Hence, the initially set access time cannot be ensured in accordance with clock frequency shift between the masters.

When the communication traffic between the slave 1 and the master, and the communication time between the slave 1 and another master are to be changed, a power saving mode shift time between the master and the slave 1 must be reset. Hence, it is difficult to sequentially accommodate the access time in accordance with a change in traffic. As a means for solving this problem, a method of notifying of a period (communication hold period) in which the slave capable of participating in the plurality of piconets does not participate in the piconet has been studied. However, a method of notifying the master of the communication hold period has not been disclosed yet, and it is difficult to perform access control in accordance with a communication condition such as the traffic.

As described above, in a radio communication scheme in which one radio communication terminal can belong to the plurality of radio networks at the same time, a timing for accessing/inaccessing to each of the networks must be arbitrated. However, this arbitration is difficult.

SUMMARY OF THE INVENTION

The present invention has been made in consideration of the above-described prior art, and has the following arrangement. More specifically, there is provided a communication apparatus connectable to a plurality of networks, characterized by comprising setting means for adjusting and setting, in accordance with a communication condition of each of the plurality of networks, a communication hold period in which the communication apparatus does not communicate with any one of the plurality of networks, notification means for notifying each of the plurality of networks of the communication hold period set by the setting means, and stop means for stopping communication with the plurality of networks on the basis of the setting of the communication hold period, wherein the setting means sets the communication hold period of each network so as to overlap portions of the communication hold periods of the plurality of networks without any overlap of communication participation times of the plurality of networks.

In the invention according to the present application, a communication apparatus belonging to the plurality of networks can simultaneously and reliably communicate with each network in accordance with the state of an application using communication, or a resource amount in communication. The communication apparatus can also ensure a pause time in which the communication apparatus does not communicate with any one of the plurality of networks. Hence, the communication apparatus cannot only appropriately distribute communication resources to the networks, but also stop power supply to a communication unit in a nonparticipation period in which the communication apparatus does not participate in any one of the networks. Therefore, power consumption of a common communication terminal can be saved.

In addition, in the invention according to the present application, the communication apparatus can reliably communicate with each network in accordance with a change in communication condition and communication environment. The communication apparatus can also ensure the pause time in which the communication apparatus does not communicate with any one of the plurality of networks. Hence, the communication apparatus cannot only appropriately distribute the communication resources to the networks, but also stop the power supply to the communication unit in the nonparticipation period in which the communication apparatus does not participate in any one of the networks. Therefore, power consumption of the common communication terminal can be saved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A is a view showing an example of an operation state definition table according to the first embodiment;

FIG. 6B is a view showing an example of a communication hold parameter table;

FIG. 7 is a timing chart showing an example of communication hold period notification processing procedures according to the first embodiment;

DETAILED DESCRIPTION OF THE PREFERRED EMBODIMENTS

First Embodiment

Figure 1:
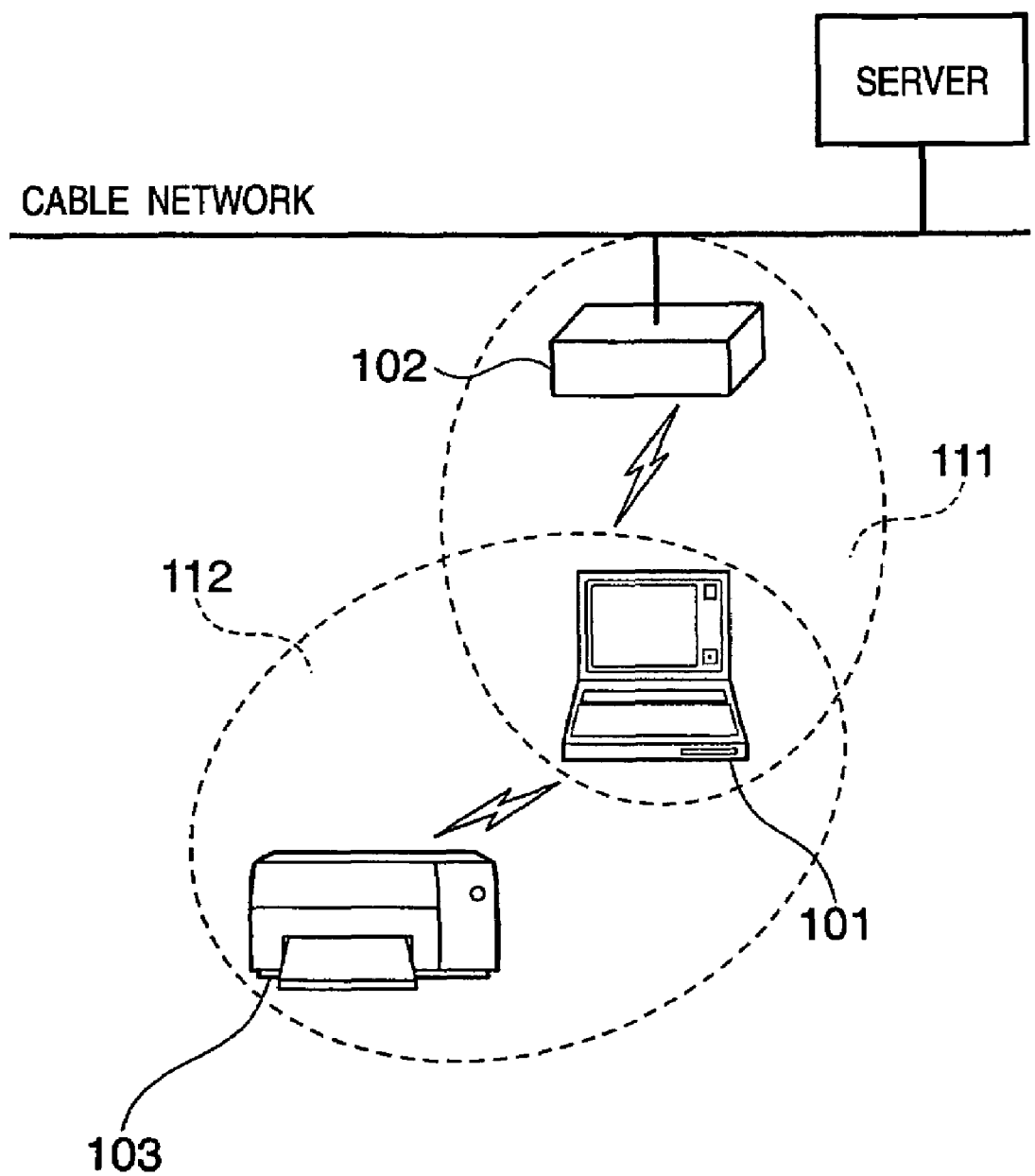
FIG. 1 is a view showing an example of an embodiment of the present invention.

The first embodiment of the present invention will be described below with reference to the accompanying drawings. FIG. 1 is a view showing an information terminal 101, access point 102, and printer 103 according to an embodiment of the present invention. In this embodiment, the information terminal 101 is connected to the access point 102 by using Bluetooth®, i.e., a local radio commutation scheme, thereby using an application such as FTP or Web access through the cable network in which the access point 102 participates. The information terminal 101 is also connected to the printer 103 by using Bluetooth® so that print data in the information terminal 101 is transferred to the printer 103 and printed. In the first and second embodiments, Bluetooth® is used as the radio communication scheme. However, any other communication scheme can be used if it implements simultaneous participation in a plurality of networks by switching the network to communicate by time division control.

Outline of First Embodiment

In this embodiment, in a piconet 111 including the access point 102 and information terminal 101, the access point 102 serves as a master terminal, i.e., the control entity of the piconet to cope with access from another device, and the information terminal 101 serves as a slave terminal. In a piconet 112 including the printer 103 and information terminal 101, the terminal 101 serves as a master terminal, i.e., the control entity of the piconet to cope with access from another device, and the printer 103 serves as a slave terminal. When the information terminal 101 communicates with both the access point 102 and the printer 103, the information terminal 101, access point 102, and printer 103 form a scatternet so that the two piconets can share the information terminal 101. In this embodiment, for more reliable communication with each terminal, the information terminal 101 controls the communication timing by notifying each terminal of a communication hold period.

The information terminal 101 executes an FTP client application to execute FTP communication with a server on the cable network through the access point 102 and a print application program (to be abbreviated as an application hereinafter) to execute print processing of the printer 103. In this embodiment, the information terminal 101 monitors the operation states of these applications. Communication is performed while optimizing the communication resources of the information terminal 101 by appropriately setting communication hold periods to be given to the access point 102 and printer 103 in accordance with the state change of each application and notifying the terminals of the set times. Furthermore, in this embodiment, the information terminal 101 sets a period (nonparticipation period) in which the information terminal 101 does not participate in any one of the piconets, by overlapping the portions of the communication hold periods to be notified to the access point 102 and printer 103. In the nonparticipation period, the communication unit of the information terminal 101 can be stopped, thus reducing power consumption.

<Arrangement of Information Terminal>

Figure 2:
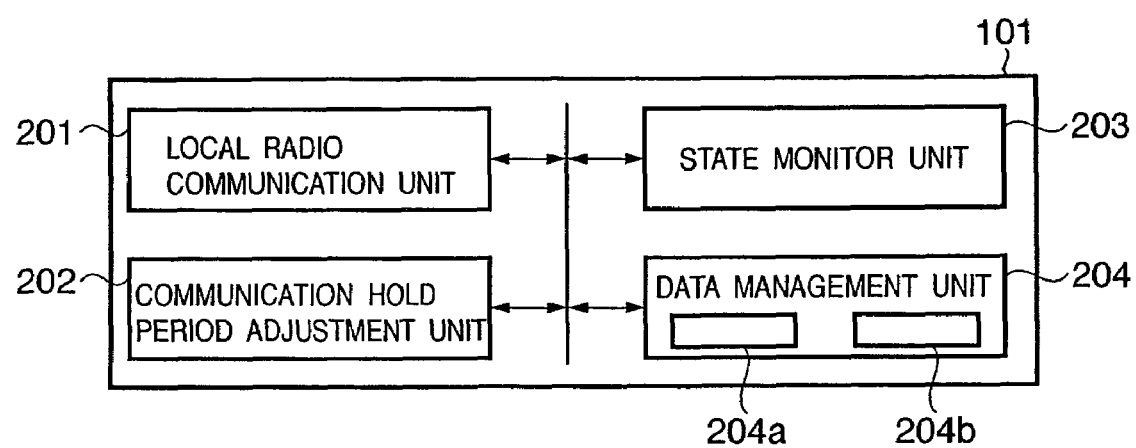
FIG. 2 is a block diagram showing the functional blocks of an information terminal according to the first embodiment.

The arrangement of the information terminal 101 according to this embodiment will be described with reference to the functional block diagram shown in FIG. 2. The information terminal 101 comprises at least a local radio communication unit 201, communication hold period adjustment unit 202, state monitor unit 203, and data management unit 204. These constituent elements are implemented by the hardware configuration of a general-purpose computer capable of executing the above-described applications, communication hardware capable of implementing Bluetooth®, and software to be executed by the computer. The local radio communication unit 201 has a function of executing radio communication with peripheral terminals by using a local radio communication scheme (Bluetooth® in this embodiment). The communication hold period adjustment unit 202 has a function of adjusting the communication hold period of each piconet in executing communication by the scatternet. The state monitor unit 203 has a function of monitoring the state of each application which runs on the information terminal 101 and uses communication by the scatternet. The data management unit 204 has a function of managing information necessary for communication control by the scatternet in, e.g., an operation state definition table 204a and communication hold parameter table 204b. The operation state definition table 204a defines the association between the operation state of each application and the length of the communication hold period. The communication hold parameter table 204b stores the operation state of a currently executed application, corresponding communication hold period, communication hold period cycle, and communication hold period start time in association with each other. The communication hold parameter table 204b is created for each application. FIG. 6A shows an example of the operation state definition table 204a, and FIG. 6B shows an example of the communication hold parameter table 204b.

<Communication Control Procedures>

Figure 3:
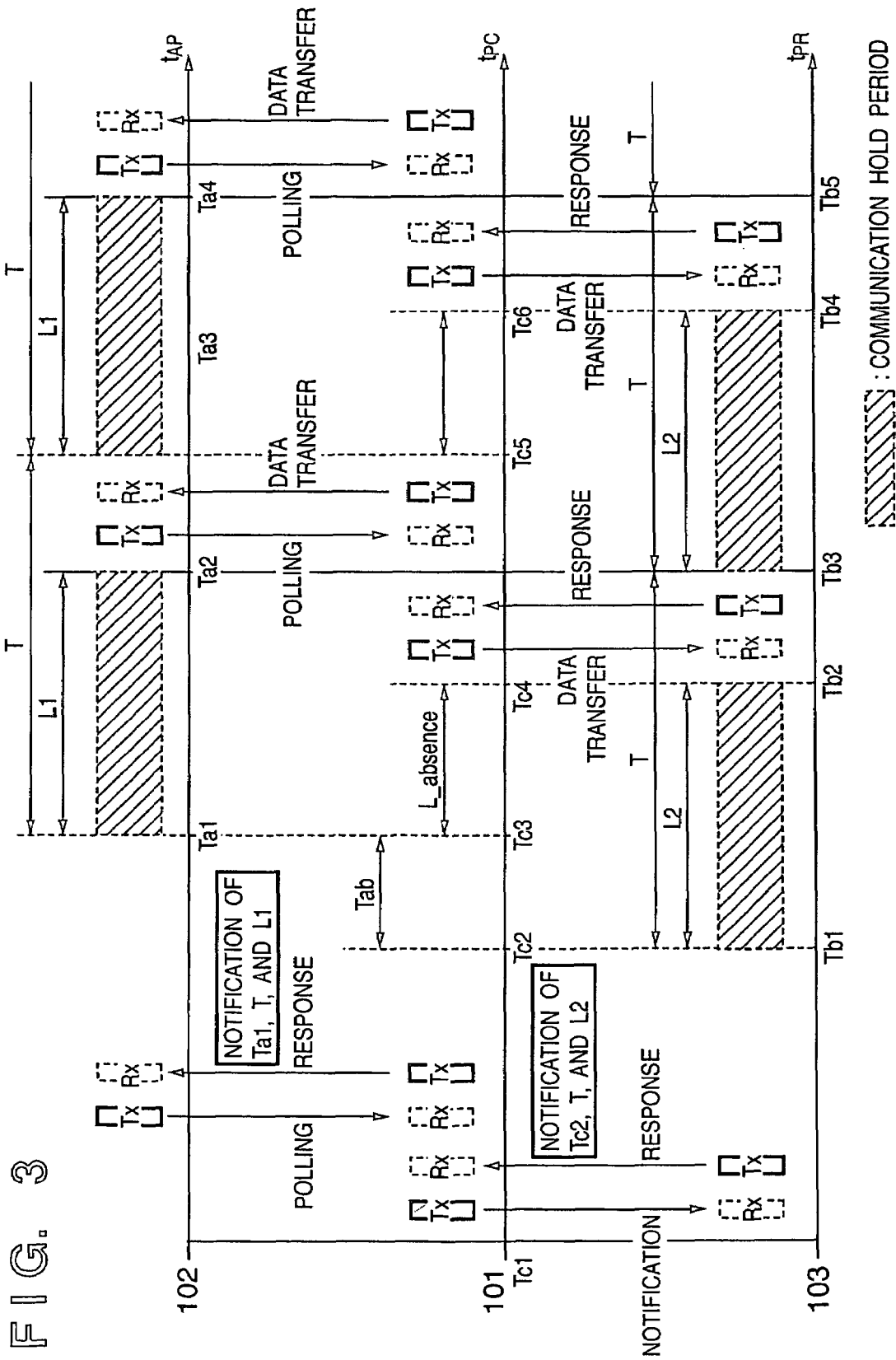
FIG. 3 is a timing chart showing an example of communication processing procedures of a scatternet according to the first embodiment.

The communication processing procedures by the information terminal 101 in the scatternet formed with respect to the access point 102 and printer 103 will be described next with reference to FIG. 3. In FIG. 3, the flow of data transmitted/received in forming the scatternet between the information terminal 101, the access point 102, and the printer 103 is shown along time axes ($t_{AP}$, $t_{PC}$ and $t_{PR}$) based on the Bluetooth® clocks of the terminals.

In forming the scatternet, the information terminal 101 notifies the access point 102 and printer 103 of communication hold periods in a period Tc1-Tc2. A communication hold period notification contains a communication hold period start time (Ta1 and Tb1 for the respective networks), communication hold period cycle T, and communication hold period length L (L1 and L2 for the respective networks).

The communication hold period start time is a value which gives the timing to start the communication hold period. The communication hold period start time is given as, e.g., the Bluetooth clock value of the master terminal in the piconet at the timing to start the communication hold period. In the piconet 111, the information terminal 101 is a slave. Hence, the information terminal 101 executes notification by, e.g., converting the Bluetooth clock of its own into a master clock value shifted by the clock offset value in the piconet 111.

The communication hold period cycleT is a value which gives the period from the start of one communication hold period to the start of the next communication hold period as the number of slots. In this embodiment, the communication hold period cycles T are equal in the plurality of piconets (i.e., networks). If the period T changes between the piconets, slots assigned to the networks overlap due to the phase shift of the communication hold period, and time division multiplex cannot be implemented.

The communication hold period length L is a value which gives the length of one communication hold period as the number of slots. The communication hold period length L is determined by the information terminal 101 such that all the following conditions are satisfied.

(1) The communication hold period length L is smaller than the communication hold period cycle T. At least one of the piconets is in the communication hold period at any timing of the communication hold period cycleT. In consideration of the state wherein the communication terminal belongs to three or more networks, under this condition, at most one network is not in the communication hold period at any timing of the communication hold period cycleT. That is, the slots assigned to the networks do not compete with each other.

(2) The communication hold periods for the access point 102 and printer 103 are always overlapped in the communication hold period cycleT at a predetermined ratio determined by the information terminal 101. That is, the communication hold periods of all the networks are overlapped for a predetermined period of time or more.

On the basis of the communication hold period e notifications determined under the above-described conditions, the information terminal 101 notifies the access point 102 of the communication hold period start time Ta1, communication hold period cycleT, and communication hold period length L1 and the printer 103 of the communication hold period start time Tb1, communication hold period cycle T, and communication hold period length L2.

Upon receiving the communication hold period notifications from the information terminal 101, the access point 102 and printer 103 stop communication with the information terminal 101 in accordance with the parameters designated by the notifications. During the communication hold period of one terminal (one of the access point 102 and printer 103), the information terminal 101 communicates with the other terminal. During the period (to be referred to as a nonparticipation period hereinafter) in which the communication hold periods of the terminals are overlapped, power supply to the local radio communication unit 201 of the information terminal 101 is stopped.

In this embodiment, the communication hold period lengths L1 and L2 are equally assigned in forming the scatternet. However, the communication hold period lengths L1 and L2 may be assigned in accordance with a parameter such as the type of device class of the partner terminal, which can be known at the start of communication with each terminal. For example, when communication with a new communication device is established during communication with the access point, and the device class of the new communication device is determined as a printer which requires high traffic, 80% of T is assigned to L1, and 40% of T is assigned to L2. Alternatively, the communication condition to an already communicating device may be confirmed in forming the scatternet, and the assignment ratio of the communication hold period lengths L1 and L2 may be changed in accordance with the condition. For example, if communication with a new communication device (e.g., PC) is established during high-traffic communication by the access point and FTP, 70% of the communication hold period cycleT is assigned to the access point, and 50% of T is assigned to the PC.

The communication hold periods of the piconets are started and ended to overlap or synchronize the slots of the communication hold periods. In the example in FIG. 3, the communication hold period length of the access point 102 is ended, and the communication hold period of the printer 103 is started in synchronism with the slot at the start of data transfer. With this control, the communication hold period cycleT is common to both terminals. Hence, the communication slot of the information terminal 101 is time-divisionally assigned to the terminal of each network to which the information terminal 101 is connected, thereby performing communication with the access point 102 and printer 103. With the above-described procedures, the information terminal 101 communicates with the access point 102 and printer 103 by the scatternet.

<Changing Communication Hold Period>

Figure 4:
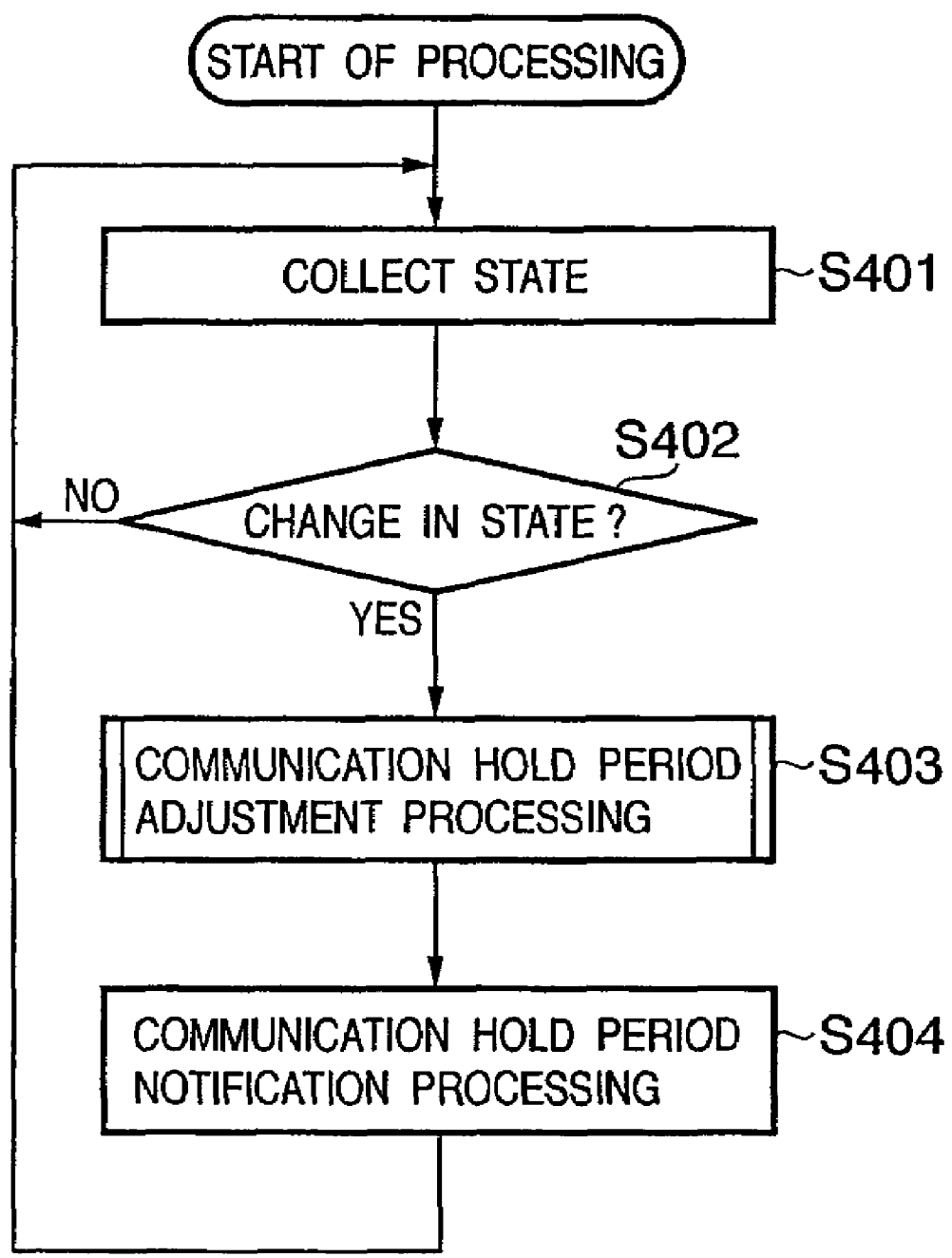
FIG. 4 is a flowchart showing communication hold period change processing procedures according to the first embodiment.

The procedures of communication hold period change processing triggered by the start of communication by the scatternet in the information terminal 101 will be described next with reference to FIG. 4.

In step S401, the state monitor unit 203 of the information terminal 101 collects the operation state of an application using communication by the scatternet. In this step, the state monitor unit 203 can collect the operation state either by periodically issuing a state request to the application or by causing the application to notify the state monitor unit 203 of, e.g., the start of communication.

In step S402, the information terminal 101 compares the operation state collected in step S401 with an operation state precedingly collected and stored in the communication hold parameter table 204b of the data management unit 204 to determine whether the application state has changed. In the communication hold parameter table 204b, an item is registered for each process ID. Hence, operation states are compared for an item (i.e., application) whose process ID coincides with that of the application. If it is determined by comparison that the operation state has changed, the collected operation state is stored (updated) in the communication hold parameter table 204b of the data management unit 204, and the flow advances to step S403. Otherwise, the flow returns to step S401.

In step S403, the information terminal 101 executes communication hold period adjustment processing of determining new communication hold period of the access point 102 and printer 103. The communication hold period adjustment processing will be described later in detail with reference to FIG. 5.

In step S404, the information terminal 101 executes communication hold period notification processing of notifying the access point 102 and printer 103 of the new communication hold periods determined in step S403. The communication hold period notification processing will be described later in detail with reference to FIG. 7. After notifying each terminal of the communication hold period in this step, the flow returns to step S401 to monitor the operation state of the application. With the above-described procedures, the communication hold period is changed.

Figure 5:
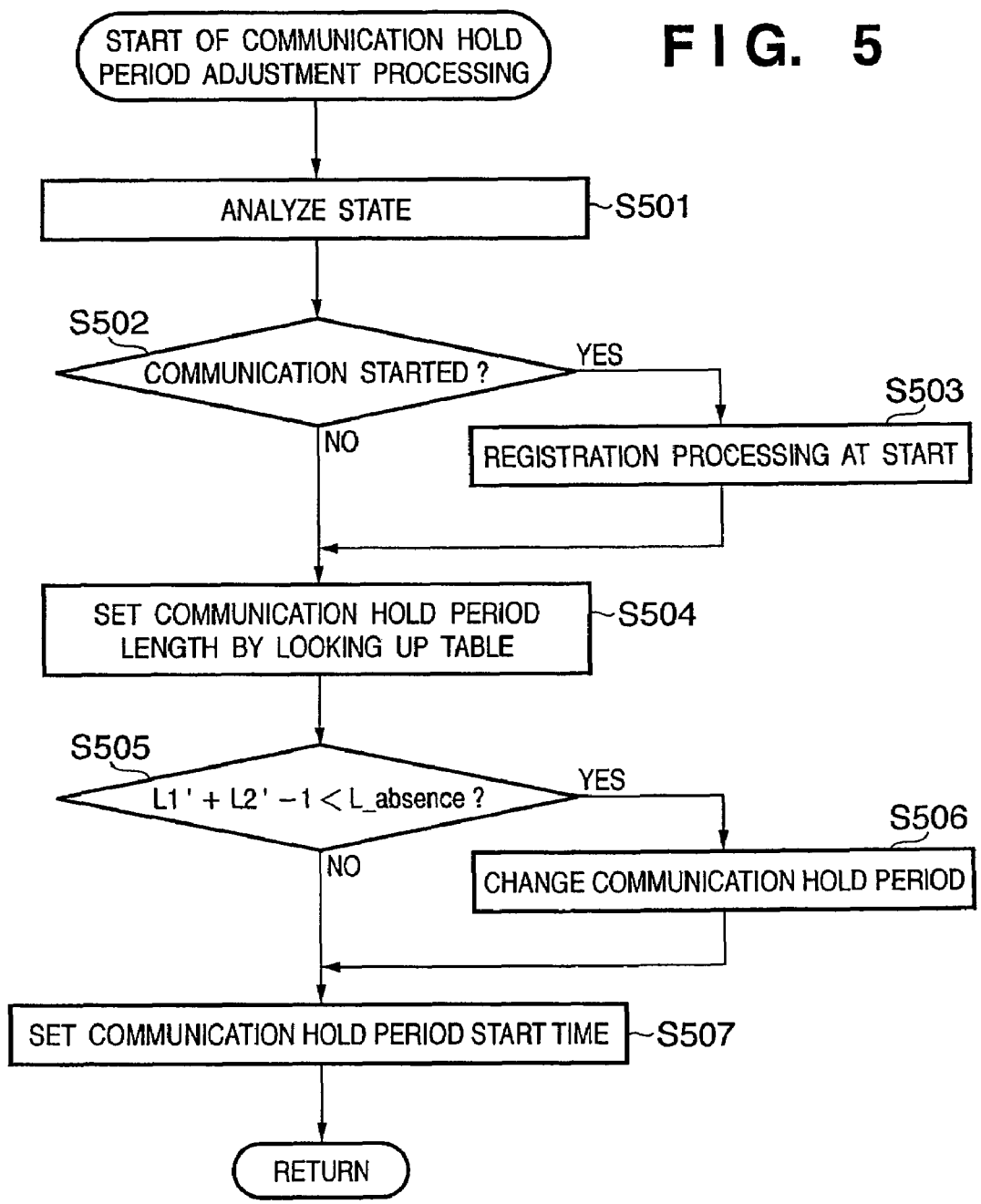
FIG. 5 is a flowchart showing communication hold period adjustment processing procedures according to the first embodiment.

The procedures of communication hold period adjustment processing (step S403) by the information terminal 101 will be described next with reference to FIG. 5. In step S501, the communication hold period adjustment unit 202 acquires the operation state of the application with a change in operation state from the communication hold parameter table 204b of the data management unit 204 and analyzes the state. In step S502, the communication hold period adjustment unit 202 determines whether the operation state is the start of communication. If YES in step S502, the flow advances to step S503. Otherwise, the flow advances to step S504.

In step S503, the communication hold period adjustment unit 202 registers the process ID of the application in the communication start state in the communication hold parameter table 204b as an operating application. In addition, the communication hold period length L corresponding to the current application operation state and the transfer priority in the operation state are registered in the communication hold parameter table 204b in association with the process ID of the operating application. The communication hold parameter table 204b also stores other parameters (period and communication hold period start time) of the communication hold period. These parameters are set in step S507. The correspondence between the current application operation state and the communication hold period length L is defined in the operation state definition table 204a. The operation state definition table can be prepared for each application using communication. Alternatively, operation states available in various applications may be put in one table, as shown in FIG. 6A, such that the applications can share the operation state definition table 204a.

FIG. 6A shows an example of the operation state definition table 204a. In the operation state definition table 204a, the value of the communication hold period length L is registered as a ratio to the communication hold period cycle T which is defined as 1. When the operation state of, e.g., the print application of this embodiment is "printing (Print_Printing)", the communication hold period length L is registered as 0.01 because a communication band as wide as possible is preferably obtained. In a state such as "print job wait (Print_Idle)", "receiving-side buffer busy (Print_Buffer_Full)", or "printer error (Print_Error)", the print application only needs to ensure a communication band to transmit/receive the printer state or command without print data communication. Hence, the communication hold period length L is registered as 0.95. Similarly, when the operation state of the FTP client application of this embodiment is "file transfer (FTP_Transfer)", the communication hold period length L is registered as 0.01 because a communication band as wide as possible is preferably obtained. In a state such as "transfer file wait (FTP_Idle)" or "file transfer error (FTP_Error)", the FTP client application only needs to ensure a communication band to transmit/receive a command. Hence, the communication hold period length L is registered as 0.95.

As shown in FIG. 6A, the operation state definition table 204a also registers a minimum nonparticipation period for ensuring the minimum length of the nonparticipation period in which the communication hold periods are overlapped, and the information terminal 101 does not participate in any one of the piconets. Unlike the other operation states, this minimum nonparticipation period is the length of "power save state (Power_Save)" period for saving power consumption by stopping power supply to the local radio communication unit 201.

The transfer priority in each operation state registered in the operation state definition table 204a is used when the communication hold period adjustment unit 202 changes the communication hold period. In this embodiment, the "high" or "low" transfer priority is registered. For example, when the communication hold period value (length) must increase in order to ensure the nonparticipation period, the communication hold period adjustment unit 202 checks the transfer priorities in the operation state table, and executes the change processing to preferentially increase the communication hold period value of the application in the operation state of low transfer priority. When using the transfer priority as described above, a given application can set the transfer priorities of all the operation states high, and the communication resources can be unfairly assigned. However, for example, the communication hold period length L in the high-priority operation state can always be set to 0.90 or more. That is, the data transfer rate in the high-priority operation state is limited, and the unfair assignment of the communication resources can be avoided.

The above-described operation state definition table 204a is prepared by the data management unit 204 in advance before the information terminal 101 executes the application.

In step S504, the communication hold period adjustment unit 202 sets, in the communication hold parameter table 204b (see FIG. 6B), a new communication hold period length L1' or L2' of the access point 102 (i.e., a piconet 111) or printer 103 (i.e., a piconet 112), which corresponds to the current application operation state, by looking up the operation state definition table 204a.

In step S505, the communication hold period adjustment unit 202 sets a minimum nonparticipation period length L_absence in which the information terminal 101 does not participate in any one of the piconets, by referring to the value corresponding to "power save state (Power_Save)" in the operation state definition table 204a. Furthermore, the communication hold period adjustment unit 202 calculates the value obtained by subtracting one from the sum of the communication hold period lengths L1' and L2', i.e., the length of the period in which L1' and L2' are overlapped in the communication hold period cycleT, and determines whether the obtained value is smaller than the value of the minimum nonparticipation period length L_absence. If YES in step S505, the flow advances to step S506. Otherwise, the flow advances to step S507.

Figure 12:
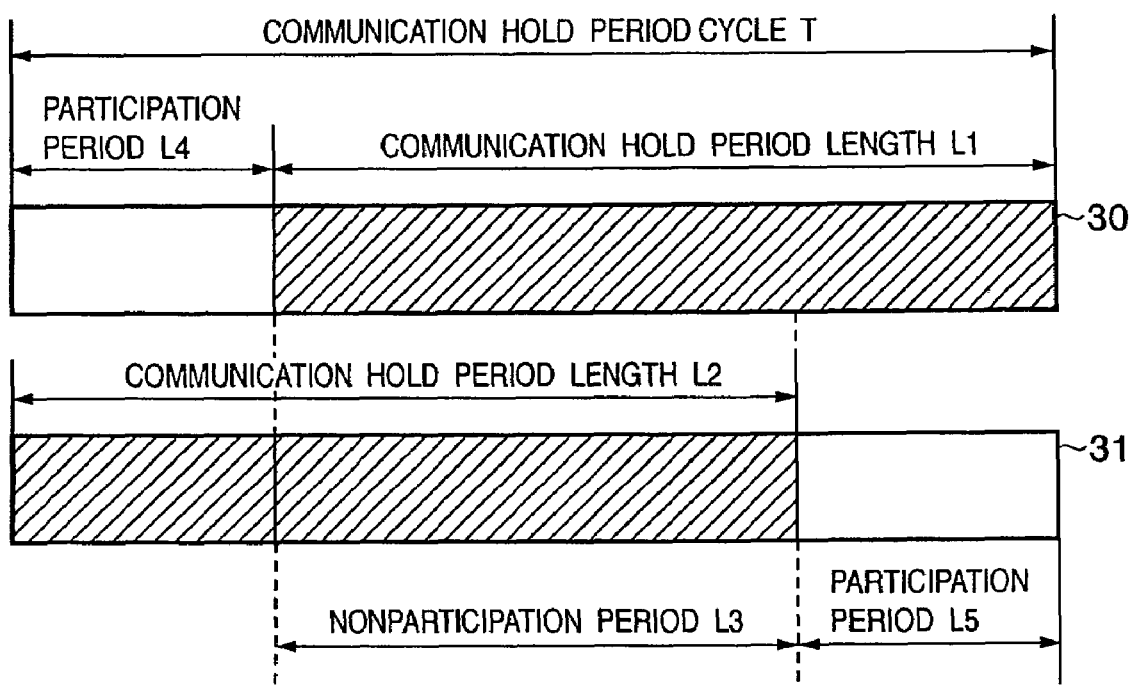
FIG. 12 is a view showing the relationship between the pieces of communication hold period information according to the second embodiment.

In step S506, the communication hold period adjustment unit 202 changes the communication hold period length such that the value obtained by subtracting one from the sum of communication hold period lengths L1' and L2' equals the minimum nonparticipation period length L_absence. However, when the nonparticipation period is longer than the minimum nonparticipation period, the adjustment need not be executed. In this embodiment, the end of one specific communication hold period synchronizes with the start of the other communication hold period, as shown in FIG. 3 or 12. For this reason, the relationship between the communication hold period lengths L1' and L2' and the communication hold period cycle is given by L1'+L2'−nonparticipation period=T (=1). That is, the value of L1'+L2'−1 is the length of the nonparticipation period when T=1. In step S506, the values of the communication hold period lengths L1' and L2' registered in the communication hold parameter table 204b are adjusted such that the length of the nonparticipation period (value obtained by subtracting one from the sum of the communication hold period lengths L1' and L2') is equal to or larger than the minimum nonparticipation period length L_absence. In this adjustment processing, the transfer priority is referred to. Hence, the following adjustment is executed.

That is, when the nonparticipation period is longer than the minimum nonparticipation period, the flow advances to step S507 without any adjustment. Otherwise, the following processing is executed in accordance with the state. When the applications using the respective networks are executed, the transfer priorities of the applications are compared with each other. The communication hold period length of the network used by the application of low priority is increased to satisfy L1'+L2'−minimum nonparticipation period=T (=1). When the communication hold period length used by the application of low priority is set to L1', new L1" is expressed by L1"=1−(L2'−L_absence). When the transfer priorities of the applications are the same, for example, the applications share the value to be increased/decreased. In this case, the new communication hold period length L1" is expressed by L1"=(1+L_absence−(L1'+L2'))/2+L1', and the new communication hold period length L2" is expressed by L2"=(1+L_absence−(L1'+L2'))/2+L2'. When the application using some of the networks to which the information terminal 101 belongs is not executed, the communication hold periods of these networks are to be adjusted. In this case, the adjustment amount may be the same as that obtained in the method for the above-described application of low priority.

Figure 8A:
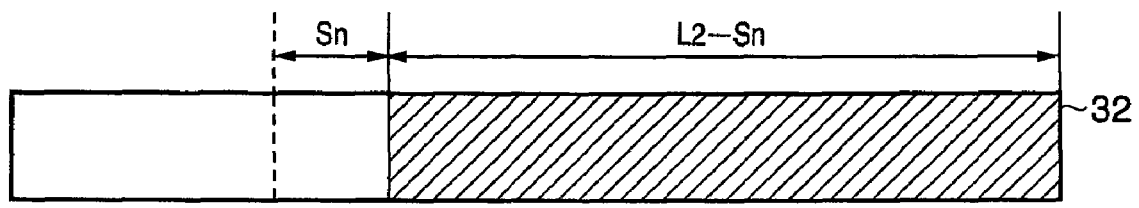
FIGS. 8A and 8B are views showing an increase in a communication hold period according to the second embodiment.
Figure 8B:
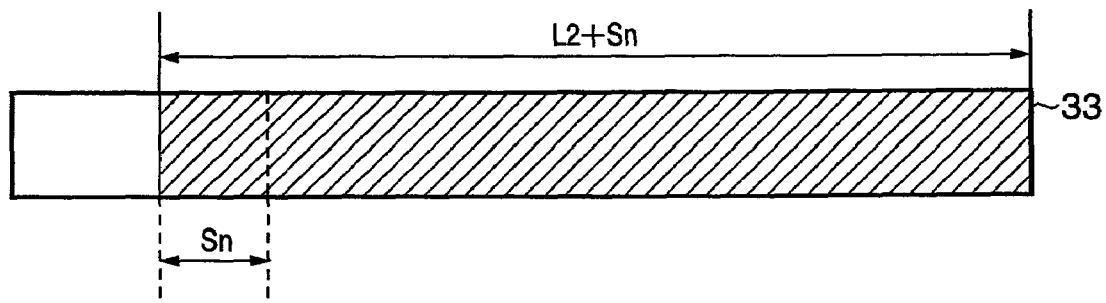

In step S507, the communication hold period adjustment unit 202 sets a new communication hold period start time of the newly set communication hold period lengths L1" and L2" in the communication hold parameter table 204b, and stores the values of L1' and L2' as the communication hold period lengths in the data management unit 204. That is, the communication hold period cycleT is unchangeable in this embodiment. The periods and starts of the communication hold periods of the respective networks synchronize with each other. For these reasons, if the communication hold period length is changed, the communication hold period start time must also be changed. When the preceding communication hold period start time (L2 shown in FIGS. 12 and 3) is used as a reference (called a reference side), and the time on the reference side is to be changed, only the hold time is changed. The communication hold period start time need not be changed. When the other time not on the reference side is to be changed, the communication hold period length is changed, and the communication hold period start time is shifted by an amount corresponding to the change. For example, when the hold time is prolonged, the communication hold period start time is advanced by the prolonged time. Either communication hold period can be used as the reference. More specifically, let L1' be the hold time before adjustment, and L1" be the hold time after adjustment in step S506. In this case, if the communication hold period start time to be adjusted is defined as T1, the communication hold period start time after adjustment can be expressed by T1−(L1"−L1'). This adjustment processing is schematically shown in FIGS. 8A and 8B. FIGS. 8A and 8B show an example of the adjustment processing of increasing/decreasing the communication hold period length and communication hold period start time by a time Sn.

Then, communication hold period notification processing in step S404 is activated to transfer the communication hold period start time, communication hold period cycle, and communication hold period length as the changed communication hold period parameters to the terminals (i.e., the access point 102 and printer 103) of the networks connected to the information terminal 101 to request the communication hold period notification processing, thereby ending the communication hold period adjustment processing. The notification is sent to the terminal whose communication hold period parameters are changed.

The communication hold period adjustment processing in step S403 will be described in detail. For example, assume that the operation state of the print application changes from "print job wait (Print_Idle)" to "printing (Print_Printing)", and the operation state of the FTP application is a "transfer file wait state (FTP_Idle)". In the communication hold period adjustment processing, the communication hold period adjustment unit 202 sets the new communication hold period length L2' of the printer 103 in the communication hold parameter table 204b, to 0.01 in step S504 by looking up the operation state definition table 204a. The communication hold period length L1' of the access point 102, which is stored in the data management unit 204, is set to L1' (i.e., kept unchanged) by the communication hold period adjustment unit 202. In this case, L1' is set to 0.95. After that, in the communication hold period adjustment processing, the flow advances to step S506 via step S505, and the values of L1' and L2' are changed such that the value obtained by subtracting one from the sum of the communication hold period lengths L1' and L2' equals the minimum nonparticipation period length L_absence (=0.20). At this time, the communication hold period adjustment unit 202 checks the transfer priority of each operation state in the operation state definition table 204a. Since only the transfer priority of the "transfer file wait (FTP_Idle)" state is "high", only the communication hold period length L2' of the printer 103 is changed to 0.25 without changing the communication hold period length L1' of the information terminal 101.

In step S507, on the basis of the changed L1' and L2', the communication hold period adjustment unit 202 calculates the new of the printer 103 under a condition that at least one of the terminals is in the communication hold period at any timing of the communication hold period cycle T, and transfers the new communication hold period parameter of the printer 103 to the communication hold period notification processing. In this example, since the communication hold parameter of the access point is not changed, the new parameter need not be notified.

In accordance with the state of the above-described detailed example, assume that the operation state of the FTP application changes from "transfer file wait (FTP_Idle)" to "file transfer (FTP_Transfer)". In the processing in step S506, the communication hold period adjustment unit 202 checks the transfer priority of each operation state in the operation state table. Since the transfer priorities of both the application operation states are "low", the values of L1' and L2' are changed such that the period length in which L1' and L2' are overlapped equals the minimum nonparticipation period length L_absence, and the change amount ratio of L1' equals that of L2'. In this case, each of the values of L1' and L2' is 0.60. After that, in step S507, on the basis of L1' and L2' set in the communication hold parameter table 204b, under the condition that at least one of the terminals is in the communication hold period at any timing of the communication hold period cycleT, the communication hold period adjustment unit 202 sets the new communication hold period start times of the access point 102 and printer 103 in the communication hold parameter table 204b to transfer the new communication hold period parameter of each terminal to the communication hold period notification processing.

Furthermore, assume that the operation state of the print application changes from "printing (Print_Printing)" to "print job wait (Print_Idle)", and the operation state of the FTP application is "transfer file wait (FTP_Idle)". The communication hold period lengths L1' and L2' are set to 0.95 in step S504. Hence, since the value obtained by subtracting one from the sum of the communication hold period lengths L1' and L2' is larger than the minimum nonparticipation period length L_absence (=0.20), each communication hold period length is kept unchanged. With the above-described procedures, the communication hold period is adjusted.

<Notification of Communication Hold Period>

The procedures of communication hold period notification processing by the information terminal 101 will be described next with reference to FIG. 7. In FIG. 7, the flow of data transmitted/received when the communication hold period is changed during communication by the scatternet between the information terminal 101, the access point 102, and the printer 103 is shown along time axes ($t_{AP}$, $t_{PC}$, and $t_{PR}$) based on the Bluetooth® clocks of the terminals. Referring to FIG. 7, the information terminal 101 notifies the access point 102 of the communication hold period L1 and the printer 103 of the communication hold period L2. The information terminal 101 executes communication by the scatternet by communicating with one terminal during the communication hold period of the other terminal.

The operation state of the printer changes, and the communication hold period of the printer 103 is changed by communication hold period adjustment processing in a period Tc4-Tc5, the information terminal 101 notifies the printer 103 of a communication hold period start time Tc5, the communication hold period cycleT, and the communication hold period length L2' by looking up the communication hold parameter table 204b which is set for the printer 103 by communication hold period adjustment processing in the period Tc4-Tc5.

Upon receiving the new communication hold period notifications from the information terminal 101, the printer 103 stops communication with the information terminal 101 in accordance with the parameters designated by the notifications. During the communication hold period of one terminal, the information terminal 101 communicates with the other terminal. During the nonparticipation period in which the communication hold periods of the terminals are overlapped, the power supply to the local radio communication unit 201 of the information terminal 101 is stopped. With the above-described procedures, the terminals are notified of the change in communication hold period during communication by the scatternet.

With the above-described arrangement and control, the apparatus of this embodiment, which belongs to a plurality of networks, can ensure a band necessary for each network by assigning a slot in accordance with the state of each application without any overlap of slots assigned to the networks. For this reason, optimum assignment can dynamically be implemented in accordance with a change in application state. In addition, the communication hold period can be ensured. That is, efficient communication and control can be implemented.

Second Embodiment

According to the second embodiment, in processing of a state monitor unit 203, the procedures of monitoring changes in a communication data amount and the number of communication links and channels will be described below. In this embodiment, a communication hold period is adjusted in accordance with not the application condition but a communication condition, more particularly, a communication data amount and the number of channels to be used. Other than structural and processing differences corresponding to the above-described differences, the arrangement and processing procedures of an information terminal in this embodiment are the same as those in the first embodiment. The first difference is that a data management unit 204 includes a communication state definition table in place of an operation state definition table 204a, and that the communication state of a communication hold parameter table 204b is stored in place of an operation state thereof. The second difference is that a communication hold period length is set in accordance with the procedures in FIG. 9, in step S403 shown in FIG. 4. In the following description, a portion common to the first and second embodiments is described from a different viewpoint.

FIG. 12 is a view showing pieces of communication hold period information which are notified from an information terminal 101 to an access point 102 and printer 103. In FIG. 12, the information terminal 101 sets a communication hold period length L1 of the access point 102 and a communication hold period length L2 of the printer 103 in the communication hold period cycle T, and notifies each device of the set communication hold period lengths L1 and L2. A nonparticipation period L3 in which the communication hold periods of the respective networks are overlapped is a period in which the information terminal does not participate in any one of the networks. The communication hold period is assigned to the network by adjusting the nonparticipation period L3. That is, when increasing the number of communication slots of a device in a given network, the communication hold period tends to decrease. Alternatively, when decreasing the number of communication slots, the communication hold period tends to increase. An advantage of this scheme is that the time for communication with the device in a desired network can be adjusted by adjusting the nonparticipation period without changing the communication hold period of the other network. Additionally, since the nonparticipation period in which the common communication terminal does not participate in any one of networks is set, power consumption can be saved by shifting the common communication terminal to a power saving mode in the nonparticipation period.

Figure 10A:
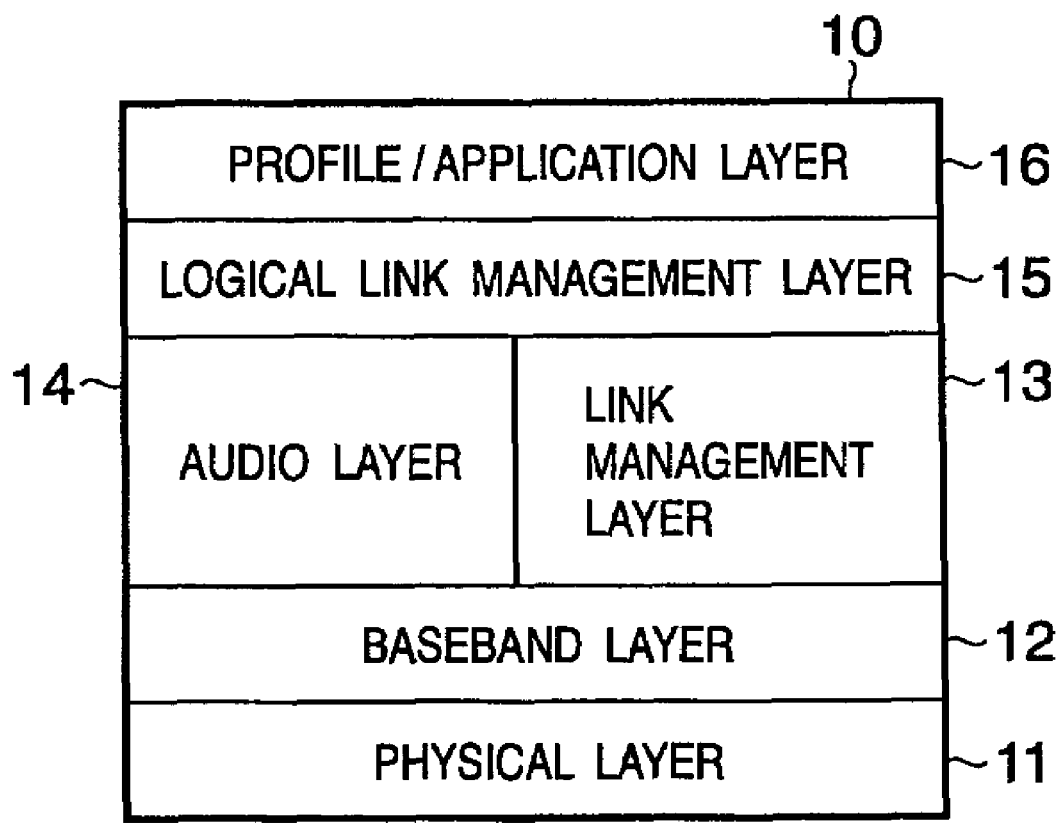
FIG. 10A is a view for explaining the protocol stack of an information terminal according to the second embodiment.

FIG. 10A is a view for explaining the Bluetooth® communication structure of the information terminal 101. The communication structure includes a physical layer 11 for physical connection control, a baseband layer 12 which manages a baseband portion, an audio layer 14 which performs management when the baseband portion establishes connection of audio communication, a link management layer 13 which manages a communication link used for communication in the baseband layer, a logical link management layer 15 which manages a logical link, and an application layer 16 such as a printing profile and print application.

Figure 10B:
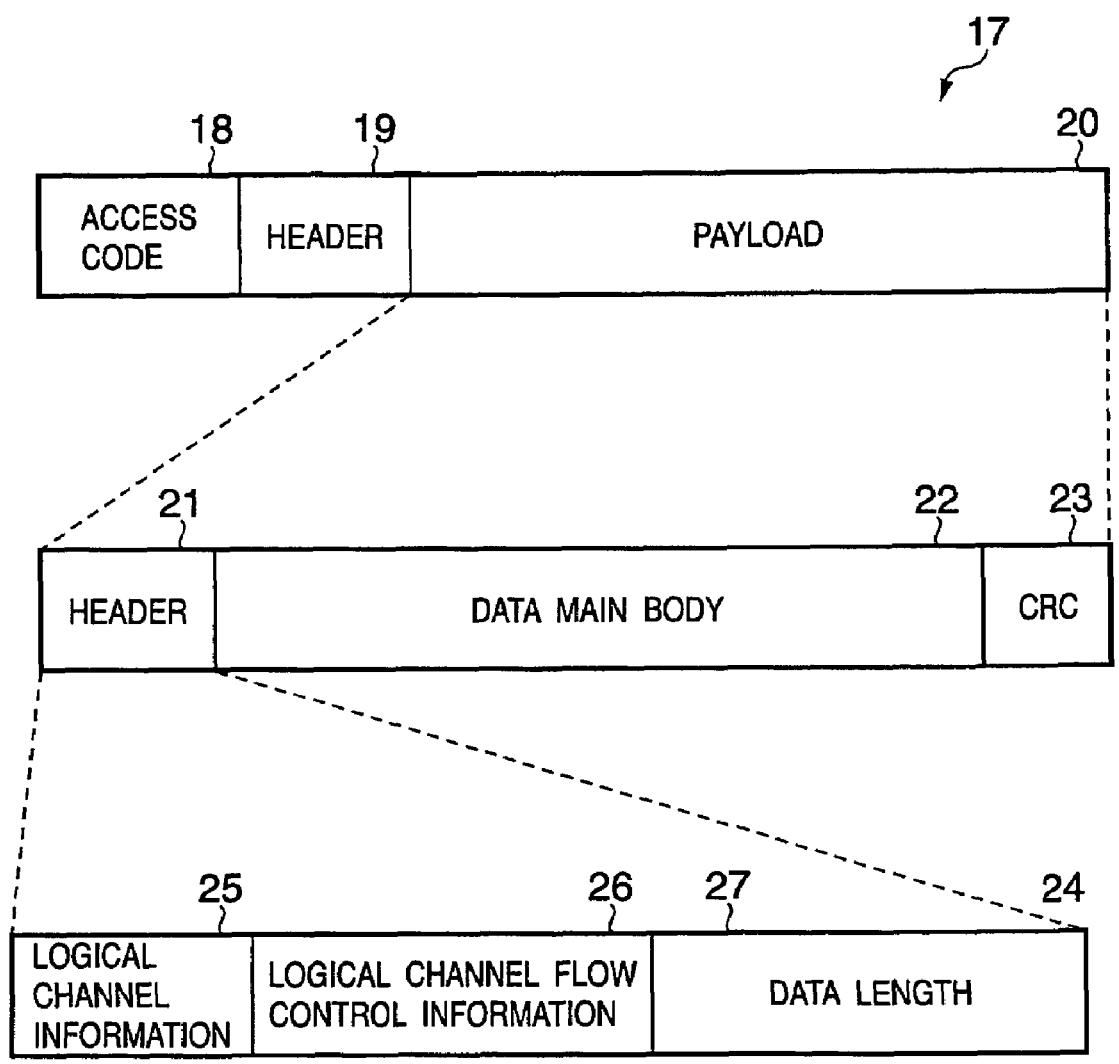
FIG. 10B is a view for explaining a communication data structure according to the second embodiment.

FIG. 10B is a view showing a packet structure 17 transmitted/received by the baseband unit 12. The packet structure 17 includes an access code 18 mainly used in synchronization processing, a header 19 including link control information, and a payload 20 which is a data portion. The header 19 includes pieces of information indicating a transmission/reception address, packet type, flow control information, error information, packet order, and the like.

A method of monitoring a change in communication data amount will now be described. In one method, the communication data amount is detected in accordance with the change in number of communication slots. The number of participation slots to be assigned to networks is compared with that of the actual communication slots. If the difference becomes smaller or larger than a predetermined number of slots, it is determined that the communication data amount is increased or decreased, and then communication hold period assignment change processing is activated. The number of the communication slots is changed when performing scheduling in a participation period notified from the network to a common node and rescheduling to assign the larger number of slots than those at a given timing, or when changing the packet type to shift to communication using the larger or smaller number of packet types.

Another method of monitoring the change in communication data amount is a method of determining the change on the basis of control packet information. As shown in FIG. 10B, the packet structure 17 includes a header portion 21, data main body 22, and CRC 23. The header portion 21 further includes logical channel information 25, logical channel flow control information 26, and data length information 27. The logical channel information 25 indicates whether the data is user or control data. If the data is the user data, the logical channel information 25 also indicates whether the data to be exchanged is present. In accordance with the presence/absence of the data to be exchanged, it can be determined whether the data has been exchanged within a period in which the common node is assigned to one network participation. That is, when the data packet with data to be exchanged is exchanged upon completion of the network participation period, it is determined that the network participation time is shorter for the communication data amount. In this case, it is determined that the communication hold period assignment period must be shortened, and then communication hold period assignment change processing is activated.

A method of monitoring a change in communication data amount by monitoring a change in the number of communication links and logical channels will be described next. The communication link is a logical link used for communication in the baseband layer 12, and the logical link is a logical channel managed by the logical link management unit. In the baseband layer 12, two types of links can be established between a master and slave. One is an SCO (Synchronous Connection-Oriented) synchronization link, and the other is an ACL (Asynchronous Connection-Less) asynchronization link. The SCO link is established to allow strict data transmission/reception so that the SCO link is mainly used for audio communication. Hence, the SCO link is suitably used to transmit/receive data at a predetermined interval. The ACL link is used for asynchronous data communication. When the SCO link and ACL links are used for communication between the master and slave, and one of the SCO link and ACL link is disconnected in communication, it is determined that the communication link is changed, and communication hold period assignment change processing is activated. When the SCO link is added to communication using only the ACL link, communication hold period assignment change processing is also activated. As described above, when one or a plurality of pairs of ACL links and SCO links are established, and the number of links changes, communication hold period assignment change processing is activated.

In the logical channel, in accordance with a request from the profile or application, the logical link management layer 15 selects one of the logical links established by control of the baseband layer 12. That is, a plurality of logical channels correspond to one logical link. For example, when the print control data is exchanged while performing print data processing by using the print profile on the single logical link, two logical channels are used. Furthermore, when a control channel is established, the number of channels changes in accordance with the profile or application. As described above, when the number of logical channels changes, communication hold period assignment change processing is activated.

As described above, the state monitor unit 203 according to this embodiment monitors the number of assignment slots, presence/absence of data to be exchanged, and an increase/decrease in the number of links and channels. In accordance with the procedures shown in FIG. 4, the above-described determination is executed in step S402. When the communication data amount is increased or decreased, or when the number of communication links and channels changes on the basis of this determination, it is determined that the state has changed, and communication hold period adjustment processing in step S402 is activated. The initial communication hold parameter at the start of communication is defined in advance in accordance with the initial value of a monitor target. For example, when monitoring the number of assignment slots, a parameter is defined in advance in accordance with the number of initial assignment slots. When the presence/absence of the data to be exchanged and the increase/decrease in the link are to be monitored, the same processing is performed.

The operation of communication hold period adjustment processing in step S403 executed by a communication hold period adjustment unit 202 will be described below. In this case, the communication hold period lengths L1 and L2 are calculated in accordance with state collection in step S401. The calculation method will be described below. A communication hold period start time Ta1 and the communication hold period cycle T are not changed. As described above, since the nonparticipation period L3 is a period in which the information terminal does not participate in any one of the networks, the communication hold period is assigned to the networks by adjusting the nonparticipation period L3. A method of assigning the nonparticipation period to the networks will be described below.

Figure 11:
FIG. 11 is a table for explaining the behavior of a change in communication condition according to the second embodiment.

FIG. 12 is a view showing communication hold period information 30 of the access point 102, and communication hold period information 31 of the printer 103 which are connected to the information terminal 101. The communication hold period cyclesT are equal to each other. The communication hold period lengths L1 and L2 are respectively set for the access point and printer. The portion L3 in which the communication hold period lengths are overlapped is the nonparticipation period in which the information terminal 101 does not participate in any one of both the networks. The period in which the information terminal 101 communicates with the access point 102 can be defined as a participation period L4 in association with the period T and communication hold period. The period in which the information terminal 101 communicates with the printer 103 can be defined as a participation period L5. In this embodiment, as in FIG. 12, the communication hold period L is adjusted in accordance with the state change by adjusting the length of the nonparticipation period L3 without changing the communication hold period cycle T. As a simple example of adjustment processing algorithm, FIG. 11 shows a table in which a changing communication hold period Sn is set in advance in accordance with the increase/decrease in the number of slots and links, and the appearance frequency of the data to be exchanged. When the communication data amount increases in an increase event, the communication hold period length is shortened by the corresponding value. Alternatively, when the communication data amount decreases in a decrease event, the communication hold period is prolonged by the corresponding value. Note that in order to prolong the participation period to shorten the communication hold period by the corresponding value, the nonparticipation period L3 must be longer than the prolongated time Sn of the participation period.

Figure 9:
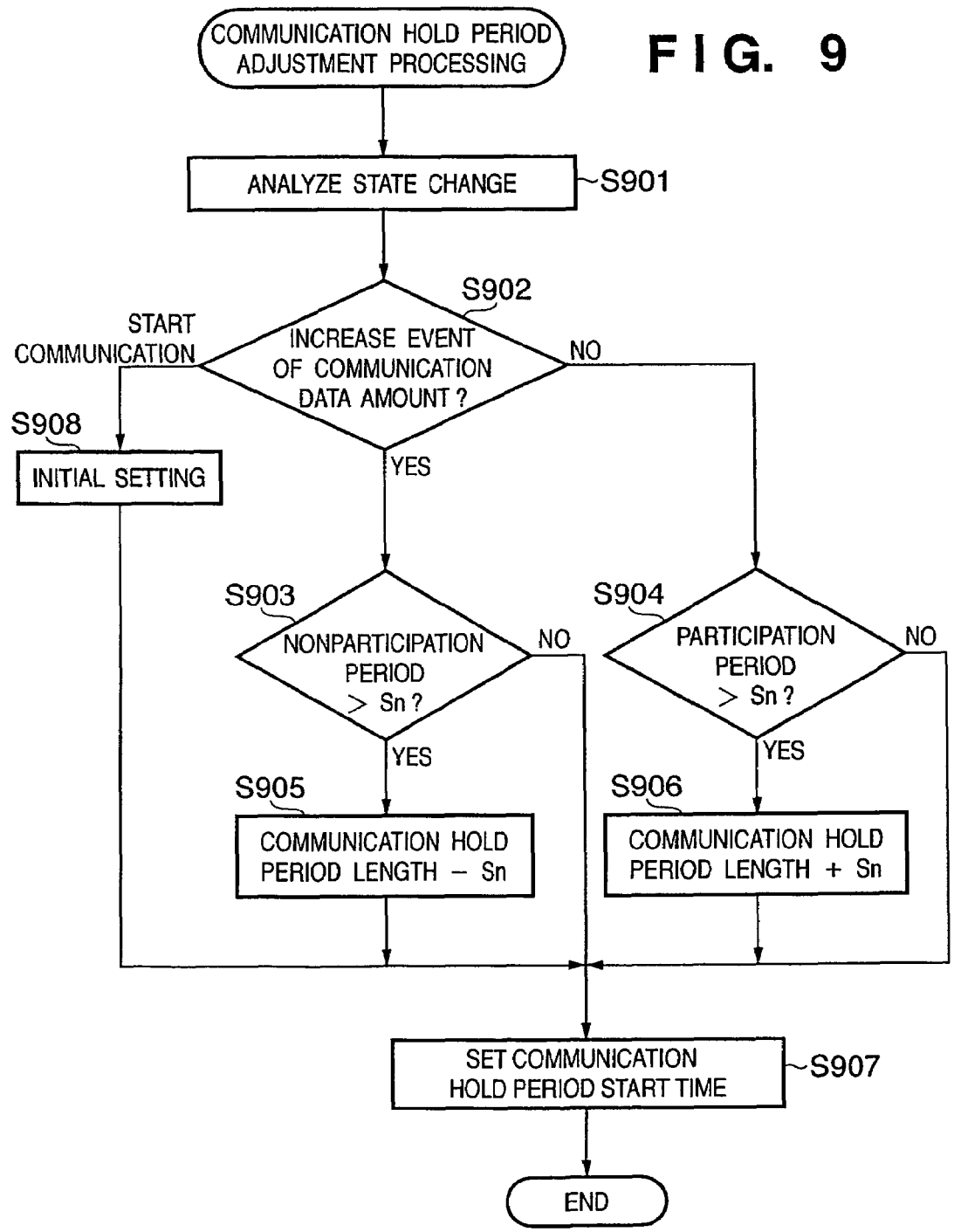
FIG. 9 is a flowchart showing the setting of the communication hold period according to the second embodiment.

FIG. 9 is a flowchart showing the flow of processing in the communication hold period adjustment processing in step S403. A case wherein the communication hold period L2 is to be changed will be described below. When it is determined that the state change has occurred in step S402, the factor of the state change in step S403 will be analyzed in step S901, i.e., whether the state change is the decrease event for prolonging the communication hold period length L2, whether the state change is the increase event for shortening the communication hold period length L2, or whether the initial setting must be done. In accordance with each event, the value Sn to be increased/decreased from the communication hold period is also obtained in step S901.

FIG. 11 shows an example of a table indicating the relationship between the state (communication data amount) change and the increase/decrease in the communication hold period used for analyzing the communication condition in step S901 as shown in FIG. 9. For example, in analysis in step S901 of the communication state, assume that the state change is the change in communication data amount based on the number of slots, and it is analyzed that the communication data amount has increased. In this case, the shortened communication hold period length is read from a table 1101 for each increased number of slots. The time length Sn to be removed from the current communication hold period length is obtained by multiplying the increased number of slots by the shortened time. When the communication data amount is decreased, the same processing is executed. However, in this case, the communication hold period length is prolonged. Note that in FIG. 11, the time length which changes in accordance with the increase/decrease in the communication data amount is defined. However, the time length may be common to these states. The same processing can also be executed when monitoring the change in communication data amount in accordance with the number of links and channels. FIG. 11 shows an example when monitoring the change in communication data amount in accordance with the number of channels.

On the basis of the analysis result, it is determined whether the state change is the increase event or decrease event (S902). If it is the increase event, the flow advances to step S903, and if it is the decrease event, the flow advances to step S904. Initial setting is executed in step S908. The communication hold period is initially defined in advance in accordance with an expected data amount (e.g., the number of slots, links, and channels, and continuous packet frequency). After that, the value is set to the communication hold period.

In step S903, the nonparticipation period L3 is compared with the communication hold period shortened time Sn. If the nonparticipation period L3 is longer than the communication hold period shortened time Sn, the flow advances to step S905, and the communication hold period length is subtracted by Sn. FIG. 8A schematically shows a case wherein the communication hold period L2 is subtracted by Sn.

In step S904, the participation period L4 is compared with the communication hold period prolonged time Sn. If the participation period L4 is longer than the communication hold period prolonged time Sn, the flow advances to step S906, and the communication hold period length is added by Sn. FIG. 8B schematically shows a case wherein the communication hold period L2 is added by Sn.

In this embodiment, the change in communication data amount is detected by monitoring the number of slots, communication links, or logical channels. However, the change in data amount can also be monitored by monitoring all of the numbers of slots, communication links, and logical channels. In this case, the state change analysis in step S901 is also executed for all the monitor targets. The increase/decrease event determination processing in step S902 is executed to calculate the communication hold period length.

Finally, in step S907, the communication hold period start time is adjusted. As described in the first embodiment, the communication hold period start time which is not on a reference side is adjusted in accordance with the prolonged or shortened time. The communication hold period start time is advanced by the time Sn in FIG. 8A, and shortened by the time Sn in FIG. 8B. On the reference side, the communication hold period start time need not be changed. In step S404, the set parameter is sent to the terminal whose communication hold period is changed.

In this embodiment, since the minimum nonparticipation period is not defined, the communication hold period for each terminal is not adjusted. When the minimum nonparticipation period is to be set, adjustment must be executed as in step S506 shown in FIG. 5.

The increased/decreased number of slots Sn is determined in accordance with the communication data amount. However, the communication hold period may be prolonged or shortened by a predetermined value in accordance with the state change.

With the above-described arrangement and control, the apparatus of this embodiment, which belongs to a plurality of networks, can adjust the number of the slots to be assigned to the networks, in accordance with the communication data amount without any overlap of slots assigned to the networks. For this reason, optimum assignment of the slot can dynamically be implemented in accordance with a change in communication data amount. In addition, the period without communication can also be ensured. That is, efficient communication and power saving can be implemented.

In the embodiments of the present invention, Bluetooth® is used as the local radio commutation scheme. However, the present invention can be applied not only to Bluetooth but also to a communication scheme such as wireless LAN which allows connection to a plurality of networks by sharing one node of networks and also allows time-divisional participation in the plurality of networks by causing the common node to notify the plurality of networks of communication timings.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-364787 and 2004-364788 both filed on Dec. 16, 2004, which are hereby incorporated by reference herein.

What is claimed is:

1. A communication apparatus which communicates with a plurality of networks, said apparatus comprising:
a setting unit that adjusts and sets, in accordance with a communication condition of each of the plurality of networks, a communication hold period in which the communication apparatus does not communicate with any one of the plurality of networks;
a notification unit that notifies each of the plurality of networks of the communication hold period set by said setting unit; and
a stop unit that stops communication with the plurality of networks on the basis of the setting of the communication hold period,
wherein said setting unit sets the communication hold period of each network so as to overlap portions of the communication hold periods of the plurality of networks without any overlap of communication participation times of the plurality of networks, and
wherein, during the communication hold period in which the communication apparatus does not communicate with any one of the plurality of networks, the communication apparatus enters a power saving mode, and
wherein the communication hold period is defined in accordance with a communication hold period start time for defining a timing to start the communication hold period, a communication hold period cycle for defining a period of the communication hold period, and a communication hold period length for defining a length of the communication hold period, and said setting unit sets the communication hold period of each network so as to set the communication hold period length shorter than the communication hold period cycle, set the networks excluding at most one network in the communication hold period at any timing of the communication hold period cycle, and set a period in which the communication hold periods of all the networks are overlapped longer than a predetermined period.

2. The apparatus according to claim 1, wherein said setting unit sets the communication hold period of the network in accordance with an operation state of an application program for communication with any one of the plurality of networks.

3. The apparatus according to claim 2, further comprising an operation state table in which the operation state of the current application program and a communication hold period length corresponding to the operation state are registered in association with each other, wherein said setting unit sets the communication hold period on the basis of the operation state of the application program and the operation state table.

4. The apparatus according to claim 1, wherein said setting unit sets the communication hold period in the network in accordance with a state of communication with any one of the plurality of networks.

5. The apparatus according to claim 4, further comprising a communication state table in which a communication hold period length which is increased/decreased in association with a change in communication data amount and a change in number of communication links and communication channels is registered,
    wherein said setting unit sets the communication hold period by looking up the communication state table.

6. A communication network system including a communication apparatus according to claim 1.

7. A control method of a communication apparatus connectable to a plurality of networks, said method comprising:
    a setting step of adjusting and setting, in accordance with a communication condition of each of the plurality of networks, a communication hold period in which the communication apparatus does not communicate with any one of the plurality of networks;
    a notification step of notifying each of the plurality of networks of the communication hold period set in the setting step; and
    a stop step of stopping communication with the plurality of networks on the basis of the setting of the communication hold period, wherein in the setting step, the communication hold period of each network is so set as to overlap portions of the communication hold periods of the plurality of networks without any overlap of communication participation times of the plurality of networks, and wherein, during the communication hold period in which the communication apparatus does not communicate with any one of the plurality of networks, the communication apparatus enters a power saving mode, and wherein the communication hold period is defined in accordance with a communication hold period start time for defining a timing to start the communication hold period, a communication hold period cycle for defining a period of the communication hold period, and a communication hold period length for defining a length of the communication hold period, and said setting step sets the communication hold period of each network so as to set the communication hold period length shorter than the communication hold period cycle, set the networks excluding at most one network in the communication hold period at any timing of the communication hold period cycle, and set a period in which the communication hold periods of all the networks are overlapped longer than a predetermined period.

8. A computer program embodied on a computer readable storage medium, for causing a computer to execute a control method according to claim 7.

9. A computer-readable recording medium on which a computer program according to claim 8 is recorded.

* * * * *